US012747912B2

(12) United States Patent
Schliebitz et al.

(10) Patent No.: US 12,747,912 B2
(45) Date of Patent: Sep. 29, 2026

(54) METHOD FOR CONFIGURING A CONTROL SYSTEM FOR A PROCESS PLANT

(71) Applicant: Linde GmbH, Pullach (DE)

(72) Inventors: Florian Schliebitz, Munich (DE); Ingo Thomas, Oberhaching (DE); Bernd Wunderlich, Starnberg (DE); Martin Pottmann, Wolfratshausen (DE); Anna Ecker, Munich (DE)

(73) Assignee: Linde GmbH, Pullach (DE)

( * ) Notice: Subject to any disclaimer, the term of this patent is extended or adjusted under 35 U.S.C. 154(b) by 745 days.

(21) Appl. No.: 17/596,994

(22) PCT Filed: Oct. 22, 2020

(86) PCT No.: PCT/EP2020/025469
§ 371 (c)(1),
(2) Date: Dec. 22, 2021

(87) PCT Pub. No.: WO2021/083544
PCT Pub. Date: May 6, 2021

(65) Prior Publication Data

US 2022/0243980 A1 Aug. 4, 2022

(30) Foreign Application Priority Data

Oct. 30, 2019 (EP) .................................... 19020607

(51) Int. Cl.
*F25J 3/04* (2006.01)
*F25J 3/02* (2006.01)
*G05B 19/4155* (2006.01)

(52) U.S. Cl.
CPC ......... *F25J 3/04848* (2013.01); *F25J 3/0295* (2013.01); *F25J 3/04296* (2013.01);
(Continued)

(58) Field of Classification Search
CPC .... F25J 3/04848; F25J 3/0295; F25J 3/04296; F25J 3/04727; F25J 2290/10;
(Continued)

(56) References Cited

U.S. PATENT DOCUMENTS 5,519,605 A * 5/1996 Cawlfield ........... G05B 13/048 700/45
6,056,781 A 5/2000 Wassick et al.
(Continued)

FOREIGN PATENT DOCUMENTS

EP 0788625 A1 8/1997
EP 3473958 A1 4/2019

OTHER PUBLICATIONS

Roffel B, et al., "First Principles Dynamic Modelling and Multi Variable Control of a Cryogenic Distillation Process", Computers & Chemical Engineering, Pergamon Press, Oxford, GB, vol. 24, No. 1. Jan. 1, 2000 (Jan. 1, 2000), pp. 111-123, p. 116-121; figures 1, 11; table 2.

*Primary Examiner* — Joel M Attey
*Assistant Examiner* — Ibrahim A. Michael Adeniji
(74) *Attorney, Agent, or Firm* — Millen, White, Zelano & Branigan P.C.; William F. Nixon

(57) ABSTRACT

A method for configuring a control system for a process plant using a dynamic model of the process plant, the dynamic model being based on at least one of thermo fluidic correlations, thermo dynamic correlations, phenomenological correlations, and equations, and being based on geometry and/or topology of components of the process plant, the dynamic model receiving process parameters as input values, the dynamic model being adapted to represent a transition from one to another state of the process plant and the dynamic model covering the entire operating range of the process plant wherein the dynamic model is used in an offline mode, in which the dynamic model is used in
(Continued)

stand-alone fashion, wherein, based on input and output values of the dynamic model, a behaviour of the process plant is predicted, and wherein, based on the predicted behaviour of the process plant, the control system is configured.

9 Claims, 3 Drawing Sheets

(52) U.S. Cl.
CPC ...... *F25J 3/04727* (2013.01); *G05B 19/4155* (2013.01); *F25J 2290/10* (2013.01); *G05B 2219/32287* (2013.01)

(58) Field of Classification Search
CPC .... F25J 3/0409; F25J 3/04412; F25J 3/04678; G05B 19/4155; G05B 2219/32287; G05B 17/02; G05B 23/0283; G05B 2219/23292; G05B 23/0243
See application file for complete search history.

(56) References Cited

U.S. PATENT DOCUMENTS

| | | | | |
|---|---|---|---|---|
| 6,326,758 | B1 * | 12/2001 | Discenzo ........... | G05B 23/0283<br>388/906 |
| 2002/0128731 | A1 * | 9/2002 | Wegerich ............... | G05B 17/02<br>700/32 |
| 2005/0107895 | A1 * | 5/2005 | Pistikopoulos ...... | G05B 13/048<br>700/74 |
| 2005/0187643 | A1 * | 8/2005 | Sayyar-Rodsari ... | G05B 13/048<br>700/28 |
| 2008/0104003 | A1 * | 5/2008 | Macharia ............... | C12M 41/48<br>706/45 |
| 2019/0113278 | A1 | 4/2019 | Thomas et al. | |
| 2020/0183370 | A1 * | 6/2020 | Pelella ................... | G05B 17/02 |
| 2020/0348636 | A1 * | 11/2020 | Jin ..................... | G05B 23/0243 |

* cited by examiner

METHOD FOR CONFIGURING A CONTROL SYSTEM FOR A PROCESS PLANT

The present invention relates to a method for configuring a control system for a process plant, and a computing unit for performing these methods.

BACKGROUND OF THE INVENTION

Process plants (also called chemical plants) are usually understood to be plants for carrying out process engineering, i.e. substance modifications, substance conversions and substance separations with the aid of purposeful physical and/or chemical and/or biological and/or nuclear effects. Such modifications and conversions typically comprise crushing, sieving, mixing, heat transferring, cohobating, crystallizing, drying, cooling, filling, and superimposed substance transformations, such as chemical, biological or nuclear reactions.

A process plant can comprise several different components such as different heat exchangers, e.g. plate-fin heat exchangers (PFHE) or coil-wound heat exchangers (CWHE), columns, e.g. distillation or adsorption/absorption or wash columns, machines like compressors, boosters, turbines, pumps, absorbers, reactors, membrane units etc. For example, process plants can be plants for producing specific gases like air separation units, natural gas plants, ethylene plants, hydrogen plants, adsorption plant, etc.

The object of the present invention is to improve the operation of such a plant.

DISCLOSURE OF THE INVENTION

This object is achieved by providing a method for configuring a control system for a process plant, and a computing unit for performing this method according to the independent claims. Advantageous further embodiments form the subject matter of the dependent claims and of the subsequent description.

The present invention relates to methods using a (detailed) dynamic model of a process plant. This dynamic model is based on thermo fluidic and/or thermo dynamic and/or phenomenological (i.e., empirical) correlations and/or equations (or, preferably, mechanical equatins) of state and physical properties of the plant and material and components used therein and geometry and/or topology of components of the process plant, it is adapted to receive (or receives) process parameters, e.g., controller set points (of or for process parameters), measurements or external signals or information, as input values, and it is adapted to represent a transition from one to another state of the process plant, in particular, of a separation column of the plant. In particular, the process plant—which is represented by the dynamic model—includes at least one of an air separation unit (ASU), a natural gas plant, an ethylene plant, a hydrogen plant and an adsorption plant.

Such a (physical) model is also called a first principles model as it is based on physical properties like heat and mass balances and the like. This model can represent the geometry and topology of equipment or components in the same level of detail that is being used in process and/or equipment design. That is, heat exchangers, for example, are modelled in one space dimension whereas distillation columns are modelled as a sequence of theoretical trays. This approach enables the use of design correlations for pressure drops, heat transfer coefficients, fluid holdup and so on. However, unlike the equipment design tools, this dynamic model in particular balances holdups for gas and liquid and energy and, hence, allows for modelling transient states of the plant. This dynamic model in particular also covers the entire operating range of the plant, reflects design knowledge and can be used during the plant's life cycle from planning and commissioning to operation.

The dynamic model covering the entire operating range of the (process) plant, preferably, is equivalent to a dynamic model that is a pressure driven model. Further, the entire operating range of the (process) plant, preferably, includes the following operating phases of the plant: start-up, regular operation, and shut-down. Normal operating conditions (for the regular operation) include, preferably, different plant rates and product mixes, as well as transitions between these operating cases. The regular operation phase, in particular, extends from the end of start-up to the beginning of shut-down, at least during normal operation. Further, the entire operating range also can include (the phases of) plant failure and/or emergency shut-down.

Further, this dynamic model also includes, in particular, a base layer control strategy consisting of flow and/or pressure and/or temperature controllers. This implies that controller set points, in particular PID controller set points, are inputs to the dynamic model instead of, e.g., valve positions. This approach has the advantage that the dynamic model can serve as a virtual plant for the configuration and pre-tuning of the basic (PID) controllers. Also, the dynamic model can assist with this configuration and pre-tuning. Moreover, minor plant and/or model mismatch with respect to valve characteristics and system pressure drops, which realistically cannot be eliminated completely, will not affect the dynamic model accuracy.

Based on the above, two basic operating modes or methods using this dynamic model are proposed. The first operating mode is an online mode in which the dynamic model is used in parallel with or during the operation of a process plant. Further, in this online mode the dynamic model can receive signals from the control system, the signals including set points for the base layer (PID) controllers (like for pressure, flow, etc.) as well as valve positions. These signals are inputs to the dynamic model. Additional signals such as temperatures and analyzer readings—which can also be determined by the dynamic model—can be used for data reconciliation. Since the plant signals and measurements can be subject to errors (such as noise, bias, drift, etc.), such a data reconciliation step can help to maintain the state of the dynamic model as close as possible to the state of the plant and to obtain a physically consistent state values (i.e., with mass, energy and component balances satisfied).

The second operating mode is an offline mode in which the dynamic model is used in stand-alone fashion and, in particular, without any connections, in particular online connections, to the control system of the plant or history about a plant. A more detailed description of such a dynamic model and a particular way to derive such a dynamic model can be found, e.g., in EP 3 473 958 A1.

Based on these two operating modes different aspects or problems with respect to the operation and/or design of a process plant can be addressed.

State estimation: Only a limited number of process states such as flows, pressures, temperatures, and concentrations are typically measured in a process plant. The speed of load changes with process plants like air separation units is limited by ensuring that the limits for nitrogen and oxygen concentration in the stream for the low pressure to the crude argon column are not exceeded. The concentrations of nitrogen and oxygen around the argon transition side draw location in the low pressure column are not or not always measured. Often, only a single analyzer point or a single temperature sensor is installed. The measured temperature corresponds to a certain concentration in the column and is derived by process design calculations. Load changes can be performed faster, if entire nitrogen, argon, and oxygen concentration profiles in the low pressure column are determined by state estimation.

Prediction: Advanced control strategies such as linear model predictive control (LMPC) or non-linear model predictive control (NMPC) have to be developed by application to active production plants, which might require much work.

Model reduction: Reduced models can be developed and validated using recorded operating data of existing air separation units. Model reduction could be simplified and speed up, if high-fidelity simulative operating data was available from detailed dynamic models of single air separation units. First, operating data could be generated as needed by simulation (even before the plant is built). Second, simulative operating data does not include measurement errors or noise. The dynamic models for operating data generation should depend solely on physical equations and relevant design information so that an adaptation to existing operating data is not necessary. Hence, model reduction, e.g., for the development of automation solutions or control loops based on artificial intelligence, is possible even before a plant is built.

Adaptation: Parameters in design correlations characterizing, e.g., heat transfer or column stage efficiencies, are of relatively high uncertainty. Comparing plant operating data with simulation data allows for evaluation of design parameters and enables equipment performance monitoring as well as validity assessment of design correlations. This, however, requires very detailed dynamic models including the examined design correlations such as dynamic model mentioned before.

In a first aspect, in particular the online operation mode, the disclosure relates to a method for operating a process plant using a dynamic model of the process plant, i.e., the dynamic model described before. In this method, signals from a control system of the process plant, the signals representing values of at least one first (or input or measured) process parameter, are received, e.g., by means of a computing unit, and fed into the dynamic model, which is, e.g., executed by such a computing unit. Further, values of at least one second (or output or simulation result) process parameter (in particular, including updated controller set points) are determined based on the dynamic model and used for operating the process plant.

Preferably, the at least one first process parameter includes at least one of valve positions, and flow, pressure and temperature set points, levels and concentrations for a controller of the control system. In general, process parameters can be any parameters relevant for operation of the plant, which, in particular, can be measured and/or used for controlling or other kind of operation. Specifically, the at least one first process parameter relates to one or several of those process parameters that are used as inputs of the dynamic model, and the at least one second process parameter relates to one or several of those process parameters that are used as outputs of the dynamic model.

In this regard, the dynamic model—in the online operation mode—can be used for estimating values of parameters (or variables) which cannot be measured directly or which are typically measured with considerable delay (e.g. compositions) in the plant. A particularly advantageous utilization of the dynamic model and the method according to the first aspect is an estimation of variable or parameter profiles, such as composition or temperature profiles in columns or temperature profiles in heat exchangers. With such detailed plant state information being available, entirely new control strategies become feasible, an example of which is disclosed in the following.

Preferably, the least one second process parameter includes a column concentration and/or a composition profile. Many of the current approaches for product composition control in air separation units (or other kinds of process plants) are based on controlling temperatures at suitable locations in the separation columns, e.g., just above the argon transition in the low pressure column. Maintaining a temperature at a set point (which also depends on the column pressure) then also implies that the composition at this point in the column is fixed. It is to be noted that temperature measurements are generally preferred for control purposes over composition analyses because they react faster and are more reliable. However, column control based on a single temperature has the following disadvantages.

The temperature measurement locations are selected during process design. Here, the goal is to select a location that provides large temperature sensitivity with respect to the manipulated variables (or parameters) such as air or column reflux flow. The temperature profile in the plant can deviate to a certain extent from the design profile and/or is strongly dependent on the operating case. Therefore, a single temperature measurement (or a low number thereof) can be problematic or insufficient for control purposes. A correction of the temperature set point as a function of pressure is necessary. However, a unique mapping between temperature and composition for a given pressure typically only exists for two-component systems.

The dynamic responses of column stage temperatures to changes in the manipulated variables (air flow or reflux flow) can exhibit strong nonlinearities: depending on the position and/or shape of the column profile, the temperature measurement could be within the range of high sensitivity (i.e., high process gain) or in areas of low sensitivity (i.e., low process gain). Such changes in process gain are extremely challenging for any linear controller. Therefore, rather conservative controller tuning will be necessary to achieve acceptable performance (and stability) over the entire operating range.

Significantly improved control performance can be achieved, if, instead of a single temperature measurement the position corresponding to a certain composition in the column is used as the controlled variable or parameter. The position, in particular, includes a tray number and/or a packing height of a column.

This new controlled variable (or parameter) can be taken directly from the composition profiles estimated by the dynamic model as described above. The controlled variables or parameters "profile location" can be used within single input single output (SISO) controllers, or within linear model predictive control approaches. This offers the following advantages over the typical temperature control approach:

The controlled variable does not depend on a single temperature measurement but is based on all the input signals fed into the dynamic model. A correction with respect to pressure is no longer necessary. The dynamic response of the controlled variable's "profile position" with respect to the manipulated variables is essentially linear, as changes in the typical manipulated variables (air, reflux flow) simply move the column profiles up or down along the column height. Therefore, the linear controllers based on these controlled variables can be tuned much more aggressively, reacting faster to disturbances or set point changes. Tighter control of the column profile in the low pressure column of an air separation unit allows for operation with lower air flow, and consequently, a lower required compressor power.

Column control via "profile locations" can be used for all of the columns typically present in an air separation unit (or also other kinds of process plants). For instance, in the low pressure column, a characteristic composition can be chosen and controlled at a position above the argon transition. Using the concentration profile for control (e.g., the location of this characteristic composition as the controlled variable), will result in approximately linear control loop behaviour, which makes it ideally suited for the application within linear model predictive control.

Further, it is of advantage, if the least one second process parameter includes a temperature profile, and is used for monitoring and/or estimating a lifetime of a heat exchanger and/or estimating consumption during lifetime, while operating the process plant. That is, temperature profile estimates of the dynamic model (or obtained by means of the dynamic model) can be used for improved performance monitoring and life time estimation for heat exchangers. Also, heat exchanger temperature profiles can be monitored to improve performance and/or to estimate lifetime consumption. The lifetime of a plant or component is influenced by heat induced thermal stress. This stress is an effect of, e.g. plant trips or restart events and also of imbalances during load shifts.

Temperature profiles in (e.g., plate-fin) heat exchangers are a key towards health monitoring of such exchangers and estimating remaining life time. Using a machine learning approach, stress levels can be estimated from temperature profiles, where the data set for learning is obtained from detailed process and finite elements method (FEM) modelling. The stress estimation hinges upon the availability of accurate temperature profiles, which are typically not available for heat exchangers in production facilities. To overcome this problem, a Kalman Filter can also be used, but there are limitations to this approach. However, such high-fidelity temperature profiles are provided by the dynamic model mentioned above. Predictions based on the dynamic model can be regularly aligned with the available temperature and other measurements by applying data reconciliation methods.

Preferably, the values of the at least one second process parameter are used, within operating the process plant, for reconciliation and/or for replacement of measured values of process parameters. This allows improving a robustness of the control system.

Data reconciliation and/or replacing measured values of process parameters preferably include that erroneous or missing data measured by means of a sensor are deleted and/or smoothed and/or replaced with corresponding values provided from simulations with or by means of the dynamic model.

Data reconciliation can be used to exploit data redundancy between signals of the control system (e.g., a distributed control system) and estimates of or provided by means of the dynamic model (i.e., the values of at least one second process parameter). If a measurement associated with a control loop is lost due to a sensor failure or if the measurement is deemed unreliable, then estimates provided by the dynamic model can be used in lieu of the actual measurement. This allows the (process) control system to continue operation "as designed", without performance degradations to a certain degree. Clearly, if a significant fraction of measurements is lost then the prediction quality of the dynamic model will also deteriorate as the data reconciliation step will not be able to exploit the same level of data redundancy as in the normal case (i.e. no sensor losses).

Further, it is of advantage, if the values of the at least one second process parameter are used for monitoring a performance of at least one component (or of equipment) of the process plant, while operating the process plant. The data reconciliation approach used for the dynamic model is based on the principle that model parameters with a relatively high uncertainty (e.g., heat transfer correlations, column stage efficiencies) are primarily adapted to achieve a model state that is consistent with the available measurements. The update of such equipment performance parameters (e.g., heat transfer coefficients) therefore provides a direct means of equipment performance monitoring.

Further, based on the data reconciliation approach outlined above, data is gathered in which the equipment performance parameters are recorded for a variety of process conditions. This allows assessing the validity of design correlations for certain operational states directly. This insight can be used to improve and/or update the correlation models to predict the performance parameters in the first place (i.e., an adaption of the model can be performed).

In a second aspect, particular in the offline operation mode, the invention relates to a method for configuring a control system for a process plant using a dynamic model of the process plant, i.e., the dynamic model described before. The control system can be a distributed control system of an entire plant or a single controller of such a system. Also, such a control system can include (control) instruments or the like.

In this method, based on input and output values of the dynamic model, a behaviour of the process plant is predicted, and, based on the behaviour of the process plant, the control system is configured. Such behaviour of the process plant, in particular, involves a predicted or modelled (future) behaviour of the plant. In other words, the dynamic model can be used to design and/or plan a control system for a process plant and, thus, to design and/or plan the entire plant for all operational ranges.

Preferably, based on the behaviour of the process plant, parameters of a controller of the control system are configured and/or tuned, in particular prior to use of the control system to control the process plant.

The operation of a process plant, e.g., an air separation unit, requires adequately tuned instruments and control loops. The dynamic model described above facilitates the configuration and tuning of, in particular, the base layer (PID) controllers prior to plant start-up, e.g. already during the design of the equipment. The fine-tuning and coordination of controller parameters throughout the plant (e.g., gains, reset times, time delays) can be performed offline, resulting in cost and time savings during plant commissioning and start-up.

Time spent at the construction site can be reduced, and test and extensive trials with the dynamic model allow for a fast and timely resolution to potential control strategy issues. With this approach, down-time or production losses due to inadequate control strategy configurations and/or loop tuning can be avoided. Overall, the plant wide control strategy can be validated very carefully, and, due to the timing way ahead of start-up or commissioning (preferably during detailed engineering) any changes to the control concept can still be implemented if necessary. Even design changes that may result of a control strategy analysis can be adapted way ahead of start-up or commissioning.

The concept of preconfiguring/tuning of the base control layer is not limited to new plants: It can be equally well used for existing plants. Independent of the on-going operation tests and optimization of the control schemes using the dynamic model can be performed, the results of which are then implemented in the plant. In this manner the present invention can be used to continuously improve plant control and plant production or manufacturing.

Further, it is of advantage, if the control system uses a controller being based on model predictive control. Then, preferably, a model for the model predictive control is deduced from the dynamic model, based on the (predicted) behaviour of the process plant, e.g., by means of reduction of the dynamic model. The model predictive control can be linear or non-linear model predictive control, wherein linear model predictive control is based on the assumption of linear dynamic systems, and nonlinear model predictive control is based on nonlinear control models.

The availability of the dynamic model as a high-fidelity representation of the plant facilitates and significantly accelerates the development of reduced models. The dynamic model can support the development of reduced models independently of the model structure selected. Potential approaches for such reduced models include:

Data-driven models: The dynamic model can be used to provide large data sets relating system inputs (input values) to system outputs (output values). These data sets can then be used for training of artificial neutral networks or other types of empirical models. The dynamic model also can be used as a reference for overall model validation.

First-principle models: the detailed dynamic model can use for tuning of a simplified first-principle model and as a reference for model validation.

Hybrid models (i.e. a combination of data-driven and first-principles models): The dynamic model can be used as a reference for overall model validation. In addition, the dynamic model can be used to provide the data required to approximate certain physical phenomena (e.g. VLE) with data driven sub-models.

The dynamic model is preferably also used for development of linear parameter-varying (LPV) systems. Starting with the full non-linear model of the dynamic model, it is possible to deduce local linear models at a current operating point. If the structure of the linear reduced models is maintained constant, then only the model coefficients are changing over time (i.e. depending on the operating point), resulting in a linear parameter-varying (LPV) system. The operating point of the plant can be thought of the scheduling function associated with the linear parameter-varying system. Step responses can be taken from the dynamic model starting at various (steady-state) operating conditions within the typical operating range of the plant, and a single linear parameter-varying system can be identified for every sub-model relating an input to an output.

The dynamic model (in the offline mode) is ideally suited for the pre-configuration of advanced process control systems such as linear model predictive control (LMPC): Dynamic relationships between selected inputs and outputs can easily be identified from the dynamic model, independently of the plant operation. Step tests on the real plant can be planned and conducted efficiently using the dynamic model.

With this approach, disturbances that might be present in the plant do not affect the step responses, and production losses or interruptions due to on-going tests on the plant can be avoided. Performing the step test on the dynamic model allows for significant time and cost savings, as the test can be performed much faster than real time, and without the need for on-site travel. Since the linear model predictive control can be configured even before the plant is started up, the advanced control system will be available from the first day of plant operation. This in turn can reduce overall commissioning time.

Such pre-configuration of model-based controllers is not limited to linear model predictive control. In a similar manner, to the steps required in setting up a linear model predictive control, a piecewise linear model predictive control or a fully non-linear model predictive control strategy can be pre-configured based on the dynamic model. The advantage of using the dynamic model for the configuration of a non-linear controller is even more significant than for the linear case, as more rigorous and more detailed system response testing is required to set up a fully non-linear model with a large range of validity. It can be expected that such extensive testing would be extremely time-consuming on the actual plant, if feasible at all.

It is to be noted that the control system configured by means of the second aspect of the invention (offline mode) can be used for operating the process plant by means of the first aspect of the disclosure (online mode).

Another aspect of the invention is a computing unit, that is configured, preferably by means of a computer program (stored on the computing unit), to perform a method according to the invention, i.e., the method for configuring a control system, or relating to the other aspect of the disclosure, the method for operating the process plant or both. Such computing unit can be provided in addition to a control system for the plant or it can be integrated in such control system or be part of it. Also, in particular with respect to the aspect of the offline mode, the computing unit can be a separate computer.

Further aspects of the invention are a computer program with program code means for causing a computing unit to perform a method according to the invention, and a computer readable data carrier having stored thereon such a computer program. This allows for particularly low costs, especially when a performing computing unit is still used for other tasks and therefore is present anyway. Suitable media for providing the computer program are particularly floppy disks, hard disks, flash memory, EEPROMs, CD-ROMs, and DVDs etc. A download of a program on computer networks (Internet, Intranet, Cloud applications, etc.) is also possible.

Further advantages and embodiments of the invention will become apparent from the description and the accompanying drawings.

It should be noted that the previously mentioned features and the features to be further described in the following are usable not only in the respectively indicated combination, but also in further combinations or taken alone, without departing from the scope of the present invention.

The invention will now be further described with reference to the accompanying drawings, which show a preferred embodiment.

DETAILED DESCRIPTION OF THE DRAWINGS

Figure 1:
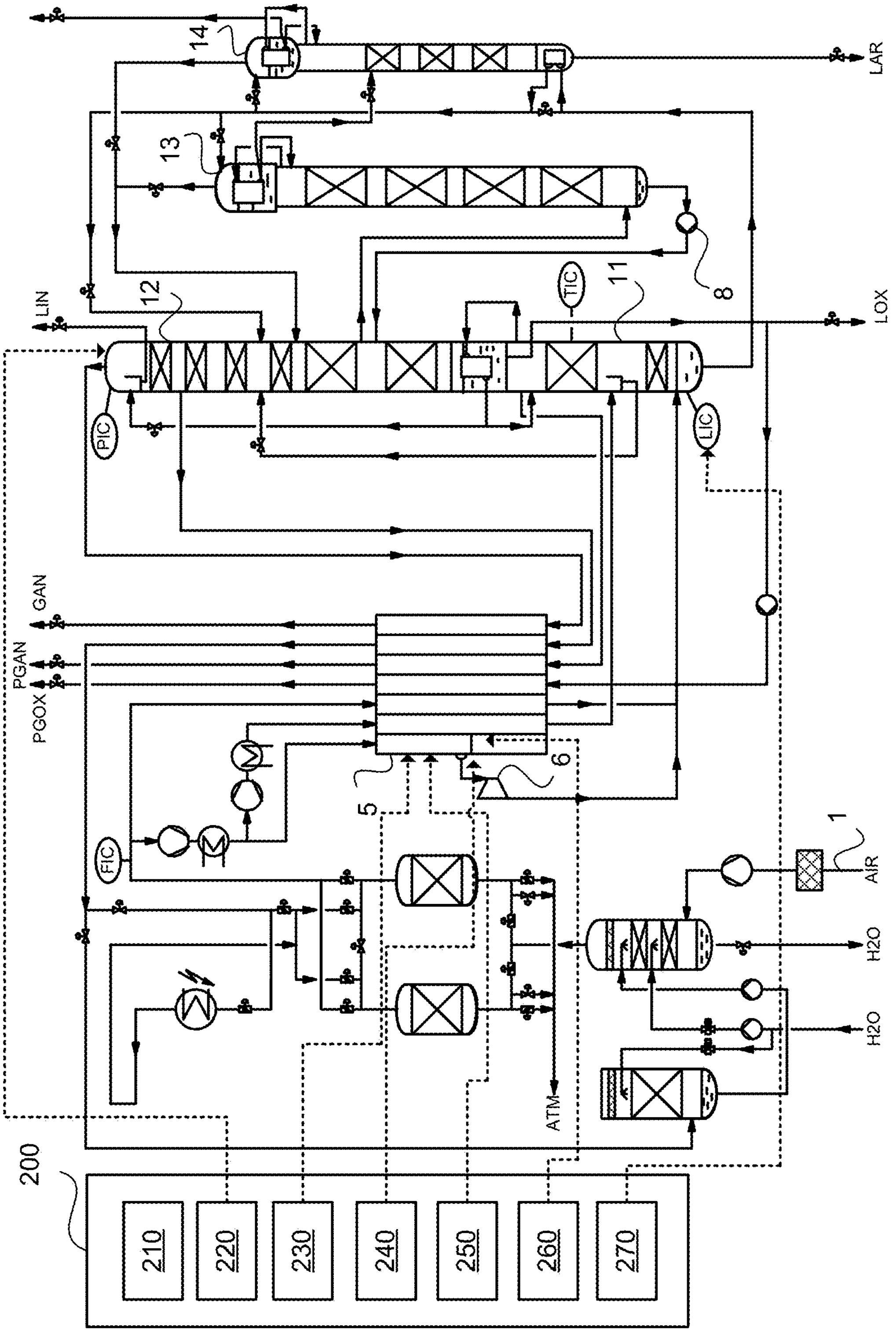
FIG. 1 schematically shows a dynamic model used within the invention in correlation to a process plant.

In FIG. 1, a dynamic model 200 used within the invention in correlation to a process plant 100 is shown. Exemplarily, the process plant 100 is formed as an air separation unit or plant.

The process plant 100 includes, among other components, a main air supply 1, a main heat exchanger 5, an expansion turbine 6, a pump 8, a high pressure column 11 and a low pressure column 12. High pressure column 11 and low pressure column 12 as well as crude argon column 13 and pure argon column 14 and associated heat exchangers, are part of a typical distillation column system.

In the air separation unit, an air feed stream, supplied via main air supply 1, is typically compressed, pre-cooled and cleaned. Further, the air stream is separated in two streams, one of which is fully cooled in the main heat exchanger 5, the other one is only partly cooled in the main heat exchanger 5. The latter one is then expanded by means of expansion turbine 6. The fully cooled air stream is supplied to the high pressure column 12 via the heat exchanger 7, and the partly cooled air stream is supplied to the low pressure column 11.

Further, a control system in the form of a distributed control system is provided for the process plant 100. Such a distributed control system includes several controllers (in particular, PID controllers) separately arranged at specific positions within the process plant 100. Such controllers include flow controllers FIC, pressure controllers PIC, liquid level controllers LIC and temperature controllers TIC. Some of those controllers are shown for the plant 100 in FIG. 1.

The dynamic model 200 is based on thermo fluidic equations 210 (e.g., thermos fluidic mechanical (cubic) equations of state) and/or equations of state and/or physical properties 220 and material and components used therein. Further, the dynamic model 200 is based on geometry and/or topology of components of the process plant 100 and on different design correlations for gas and liquid hold up, for pressure drops 230, and for heat transfer coefficients 240. Further, the dynamic model 200 is preferably based on material constants like metal heat capacity 250. This model represents the geometry and topology of equipment in the same level of detail that is being used in process design.

Design correlations are used to derive a mechanical design from thermodynamic process data. Design correlations can be such as heat transfer (which depends on the actual design of the equipment such as heat transfer area, fin sizes, stream pattern, etc.) between different media inside a heat exchanger or heat and mass transfer on a sieve tray inside a distillation column (which depend e.g. on phase boundary area, fluid velocities due to the actual design, etc.). In other words, such design correlations can be equations for calculating, e.g., heat transfer in a heat exchanger or columns.

Heat exchangers are represented, in the dynamic model 200, in one space dimension, i.e., in 1-D spatial resolution, denoted by reference numeral 260, as shown, e.g., for the main heat exchanger, whereas distillation columns are modelled as a sequence of trays or comparable simulation approaches. This approach enables the use of design correlations for pressure drops, heat transfer coefficients and so on. However, unlike the equipment design tools, the first principles dynamic model models holdups for gas, liquid and heat and hence allows for modelling transient plant states.

The dynamic model 200 is also adapted to receive controller set points of process parameters as input values, in particular, it includes base layer control 270 like for flow, pressure and temperature (PID) controllers as mentioned with respect to the process plant above. Exemplarily, the correlation to two of those controllers is shown. This implies that (PID) controller set points are inputs to the dynamic model 200 instead of valve positions.

Figure 2:
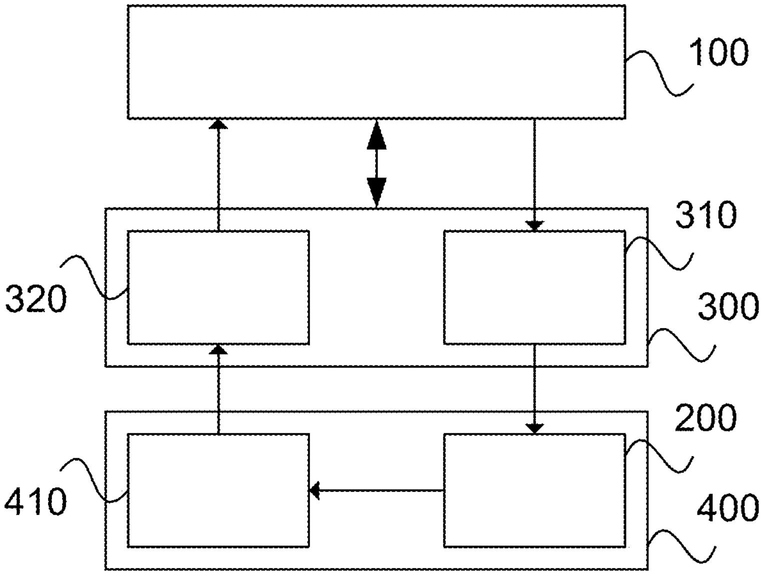
FIG. 2 schematically shows a method according to the disclosure in a preferred embodiment.

In FIG. 2, a method according to the disclosure in a preferred embodiment is shown. The dynamic model 200, described above, is used during operation of the process plant 100, for which the dynamic model 200 is made.

For operating the process plant 100, a control system 300 in the form of a distributed control system including (at least) individual, separately arranged controllers for temperature, flow and liquid level as shown in FIG. 1 and described above. For sake of clarity, these individual controllers are not shown in FIG. 2. The dynamic model 200 is operated or executed on a computing unit 400 which can be part of the control system 300 or a separate computer. This kind of operation is an aspect of the online mode mentioned before.

In the method, signals from the control system 300 are received and fed into the dynamic model 200. The signals represent values of at least one first process parameter, indicated with reference numeral 310. This at least one first process parameter includes, e.g., valve positions, and, in particular, flow, pressure and temperature set points for the individual controllers mentioned before. The values of these first parameters can include (currently) measured data and/or historic data.

Based on and using the dynamic model 200, values of at least one second process parameter are determined. This at least one second process parameter includes, in the embodiment shown in FIG. 2, a column profile 410.

Figure 3:
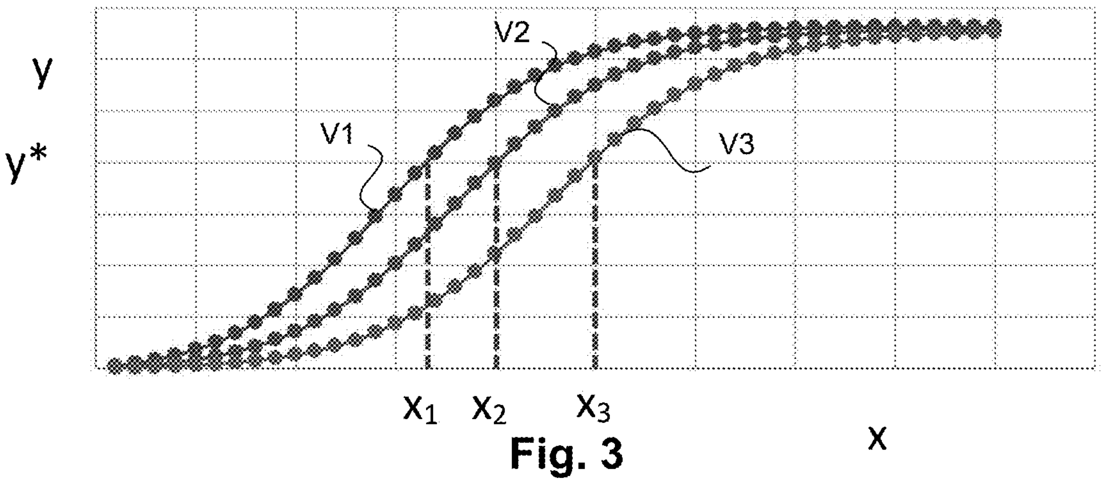
FIG. 3 schematically shows process parameters used within the method shown in FIG. 2.

Typical column profiles and the process parameter to be used or determined within this method are shown in FIG. 3. In particular, FIG. 3 shows concentration profiles v1, v2, and v3 for different values of a manipulated variable MV (MV1, MV2, MV3), e.g. air flow. These profiles show, e.g., the mole fractions y of the component of interest as a function of the packing height or stage number x in a distillation column.

For the purpose of process control, a location (e.g. packing height) corresponding to a characteristic concentration of the component of interest (e.g. y*) is chosen as the controlled variable. The parameters x1, x2 and x3 are these locations corresponding to the values of the manipulated variables MV1, MV2, and MV3.

This allows significantly improved control performance of or compared to using a (single) temperature measurement. Temperature measurement locations are typically selected during process design. Here, the goal is to select a location that provides large temperature sensitivity with respect to the manipulated variables such as air or column reflux flow. The temperature profile in the plant, however, can deviate to a certain extent from the design profile and/or it can be strongly dependent on the operating case. Therefore, a single temperature measurement may be problematic or insufficient for control purposes.

This new controlled variable or parameter can directly be taken from the composition profiles estimated by the dynamic model. The controlled variables "profile location" can be used within SISO controllers, or within (in particular, linear or non-linear) MPC approaches. For example, such a model predictive controller 320 which is to be supplied with the values or set points obtained from the dynamic model is shown. Such model predictive controller could include one, several or all of the individual controllers of the control system 300 mentioned above.

This offers the following advantages over the typical temperature control approach: The controlled variable does not depend on a single temperature measurement but is based on all the input signals to the dynamic model 200. A correction with respect to pressure is no longer necessary and the dynamic response of the control variable's "profile position" with respect to manipulated variables is essentially linear, as changes in the typical manipulated variables (air, reflux flow) simply move the column profiles up or down along the column height. Therefore, the linear controllers based on these controlled variables can be tuned much more aggressively, reacting faster to disturbances or set point changes. Tighter control of the column profile in the low pressure column of the air separation unit allows for operation with lower air flow, and consequently, a lower required compressor power.

Figure 4:
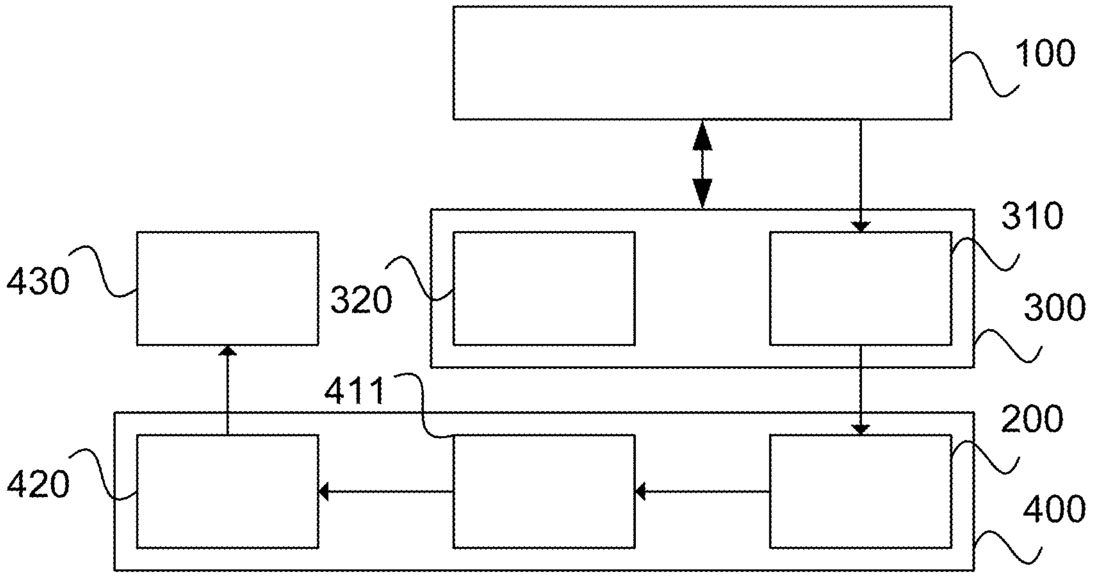
FIG. 4 schematically shows a method according to the disclosure in a further preferred embodiment.

In FIG. 4, a method according to the disclosure in a further preferred embodiment is shown schematically. The dynamic model 200, described above, is used during operation of the process plant 100, for which the dynamic model 200 is made.

For operating the process plant 100, a control system 300 in the form of a distributed control system including (at least) individual, separately arranged controllers for temperature, flow and liquid level as shown in FIG. 1 and described above. For sake of clarity, these individual controllers are not shown in FIG. 4. The dynamic model 200 is operated or executed on a computing unit 400 which can be part of the control system 300 or a separate computer. This kind of operation is also an aspect of the online mode mentioned before.

In the method, signals from the control system 300 are received and fed into the dynamic model 200. The signals represent values of at least one first process parameter, indicated with reference numeral 310. This at least one first process parameter includes, e.g., valve positions, and, in particular, flow, pressure and temperature set points for the individual controllers mentioned before. The values of these first parameters can include (currently) measured data and/or historic data.

Based on and using the dynamic model 200, values of at least one second process parameter are determined. This at least one second process parameter includes, in the embodiment shown in FIG. 4, a temperature profile 411 for, e.g., the main heat exchanger. This temperature profile 411 is then used, within operating the process plant, for estimating or determining a lifetime 430 of that main heat exchanger. This can be performed, e.g., by means of a machine learning or AI model 420. Such model is, e.g., disclosed in WO 2019/015805 A1.

Temperature profiles in (plate-fin) heat exchangers are a key towards health monitoring of such heat exchangers and estimating remaining life time. Using a machine learning approach, stress levels are estimated from temperature profiles, where the data set for learning is obtained, e.g., from detailed process and FEM modelling. The stress estimation hinges upon the availability of accurate temperature profiles, which are typically not available for heat exchangers in production facilities. Detailed temperature profiles are provided by the dynamic model. As outlined above, the predictions of the dynamic model can be regularly aligned with the available temperature and other measurements by applying data reconciliation methods.

In typical cases, there is a high sensitivity on the simulated temperature profiles with respect to the process input (e.g. small deviations in flow could have significant impact on temperature profiles). Also, direct measurement of metal temperatures (by means of, e.g., smart equipment) can be used. Nevertheless, for specific applications it is possible to estimate lifetime consumptions based on simulated temperature profiles (if heat exchanger profiles are one dimensional).

Figure 5:
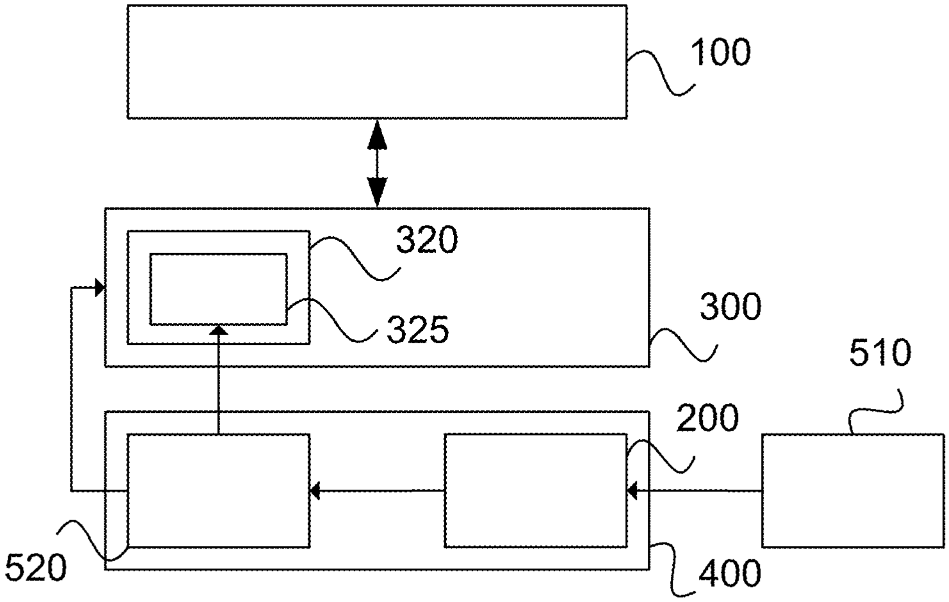
FIG. 5 schematically shows a method according to the invention in a further preferred embodiment.

In FIG. 5, a method according to the invention in a further preferred embodiment is shown schematically. The dynamic model 200, described above, is used to configure the control system 300, which afterwards can be used to operate the process plant 100. It is to be noted that the (physical) process plant 100, although shown in FIG. 5, is not necessary for performing the method.

The control system 300 includes, as also mentioned with respect to FIGS. 2 and 4, controllers which, in turn, can be linear or non-linear model predictive controllers, exemplarily shown with reference numeral 320. Such model predictive controller is based on a model of the process to be controlled, the model of the model predictive controller denoted with reference numeral 325.

In the method, based on input values and output values of the dynamic model 200, a predicted behaviour of the process plant is predicted. Then, based on the predicted behaviour of the process plant, the control system 300 is configured.

The input values 510 can include, e.g., process parameters like step changes for air flow, products, flows, reflux and the like. Corresponding output values 520 can include, e.g., step responses for temperatures, product purities and the like.

Based on these output values 520, parameters of the model predictive controller 320 of the control system 300 can be configured and/or tuned. Also, based on these output values 520, the model 325 for the model predictive controller 320 can be deduced from the dynamic model 200.

The dynamic model 200 (in the offline mode) is ideally suited for the pre-configuration of advanced process control systems such as linear model predictive control (LMPC): Dynamic relationships between selected inputs and outputs can easily be identified from the dynamic model, independently of the plant operation. Step tests on the real plant can be planned and conducted efficiently using the dynamic model. With this approach, disturbances that might be present in the plant are not affecting the step responses, and production losses or interruptions due to on-going tests on the plant can be avoided.

Performing the step test on the dynamic model translates into significant time and cost savings, as the test can be performed much faster than real time, and without the need for on-site travel. Since the LMPC can be configured even before the plant is started up, the advanced control system will be available from the first day of the plant operation. This in turn can reduce overall commissioning time.

This pre-configuration of model-based controllers is not limited to LMPC. In a similar manner to the steps required in setting up an LMPC, a piecewise linear MPC or a fully nonlinear MPC strategy (NMPC) can be pre-configured based on the dynamic model. The advantage of using the dynamic model for the configuration of a nonlinear controller is even more significant than for the linear case, as more rigorous and more detailed system response testing is required to set up a fully nonlinear model with a large range of validity. It can be expected that such extensive testing would be extremely time-consuming on the actual plant, if feasible at all.

The invention claimed is:

1. A method for configuring a control system for a process plant, using a dynamic model of the process plant, the method comprising:

configuring the control system for the process plant using the dynamic model of the process plant, the dynamic model being a first principles model and being based on at least one of equations of state and physical properties of the plant and material and components used therein, and being based on geometry and/or topology of components of the process plant, the dynamic model receiving process parameters of the process plant as input values, the dynamic model being adapted to represent a transition from one to another state of the process plant, and the dynamic model being a pressure driven model and covering the entire operating range of the process plant, wherein the entire operating range of the process plant includes the following operating phases of the plant: start-up, regular operation, and shut-down, wherein the dynamic model is used in an offline mode, in which the dynamic model is used in stand-alone fashion, to configure the control system prior to start-up of the plant, the control system using a controller being based on model predictive control, wherein the model predictive control has a control model, wherein, based on input and output values of the dynamic model, a behavior of the process plant is predicted, wherein the control model for the model predictive control is deduced from the dynamic model, based on the behavior of the process plant, and wherein, based on the predicted behavior of the process plant, the control system is configured.

2. The method according to claim 1, wherein, based on the predicted behavior of the process plant, parameters of a controller of the control system are configured and/or tuned.

3. The method of claim 2, wherein the parameters of the controller of the control system are configured and/or tuned prior to use of the control system to control the process plant.

4. The method according to claim 2, wherein a linear parameter-varying system is deduced from the dynamic model, based on the behavior of the process plant.

5. The method according to claim 1, wherein the process plant includes at least one of a gas processing plant, an air separation unit, a natural gas plant, an ethylene plant, a hydrogen plant, and an adsorption plant.

6. The method according to claim 1, wherein, in the offline mode, the dynamic model further is used without any online connections to the control system of the process plant or history about the process plant.

7. The method according to claim 1, wherein the entire operating range of the process plant further includes plant failure and/or emergency shut-down.

8. A computing unit, configured by means of a computer program, to perform the method according to claim 1.

9. The method according to claim 1, wherein the entire operating range of the process plant further includes plant failure and emergency shut-down.

* * * * *